United States Patent [19]

Burrage

[11] 4,397,087

[45] Aug. 9, 1983

[54] FOOD-TYPE COMBINATION UTILITY DEVICE HAVING HAMMER-LIKE HEAD

[76] Inventor: Robert H. Burrage, MR 57 - Stonewood Rd., York, Pa. 17402

[21] Appl. No.: 275,624

[22] Filed: Jun. 22, 1981

[51] Int. Cl.[3] ............................................. A47G 21/06
[52] U.S. Cl. ....................................... 30/120.3; 17/75
[58] Field of Search ............... 30/120.1, 120.2, 120.3, 30/120.5, 125; 17/75, 71; 7/110, 144

[56] References Cited

U.S. PATENT DOCUMENTS

| | | |
|---|---|---|
| 75,917 | 3/1868 | Huffnagle . |
| 98,102 | 12/1869 | Pattberger . |
| 411,381 | 9/1889 | Huppmann . |
| 990,543 | 4/1911 | Gilchrist . |
| 2,105,239 | 1/1938 | Bachtold ........................ 30/125 X |
| 3,846,908 | 11/1974 | Allievi . |
| 4,103,395 | 8/1978 | Latorella . |
| 4,173,829 | 11/1979 | Papalardo ........................ 30/120.3 |

FOREIGN PATENT DOCUMENTS 1062897 12/1953 France ............................... 30/120.4

*Primary Examiner*—Jimmy C. Peters
*Attorney, Agent, or Firm*—C. Hercus Just

[57] ABSTRACT

A utility device for use in operating upon shell-type food products such as nuts and shell fish, comprising a transverse head and a pair of handles having one end of each pivotally connected within a recess in said head, the handles having opposed curved recesses adjacent the aforementioned one end of each and also having mating flat surfaces extending from the other ends and abutting each other, in combination with a metal knife blade provided with a unitary handle having a socket extending into the end from which the blade projects, the socket being complementary to the other ends of the pivoted handles and frictionally but separably receiving said other ends and the flat surfaces of said pivoted handles having opposing grooves forming an elongated recess complementary to the shape of the blade and receiving it, whereby the unitary handle serves to utilize the head as a shell-cracking handle.

6 Claims, 5 Drawing Figures

FOOD-TYPE COMBINATION UTILITY DEVICE HAVING HAMMER-LIKE HEAD

BACKGROUND OF THE INVENTION

The present invention pertains to a combination tool primarily adapted for operating upon shell-like food, such as various types of seafood, including crabs, oysters and lobsters, and also for cracking nuts of different kinds, as well as possibly cracking bones for purposes of exposing marrow, and otherwise. Combination tools of various kinds are very old. Many of them are of a mechanical nature for use by mechanics on machinery and the like, and include all sorts of combinations of pliers, screw drivers, wrenches, cutting blades and various other things. Many of them are provided with handles and some have various pairs of handles pivotally connected. For example, in the field of mechanic's tools, prior U.S. Pat. No. 990,543 to Gilchrist, dated Apr. 25, 1911, is typical. In the food line for operating upon shellfish, relatively recent U.S. Pat. No. 4,103,395 to Latorella, dated Aug. 1, 1978, is exemplary. Also in the food line, but of a somewhat different nature than Latorella's tool, is U.S. Pat. No. 3,846,908 to Allievi, dated Nov. 12, 1974, the same being a tool for clam, oyster and nut cracking and opening.

Also, various kinds of unitary tool, especially for use with oysters, have been developed, typical very old examples of which comprise the subject matter of prior U.S. Pat. Nos. 75,917 to Huffnagle, dated Mar. 24, 1868, and 411,381 to Huppmann, dated Sept. 17, 1889. These are representative of tools including hammer heads and oyster-opening knife blades. Still another example of the combination ice pick and oyster knife is found in relatively old U.S. Pat. No. 98,102 to Pattberger, dated Dec. 21, 1869, in which a handle has an oyster knife blade projecting from one end and mounted loosely for storage in an opening in the handle is a pair of elongated ice pick blade and wire member respectively adapted to be removed from the storage opening and mounted so as to project from the handle, particularly in regard to the ice pick blade.

From the foregoing, it will be seen that a relatively wide range of combination tools, having hammer-like heads thereon, and especially for use in connection with shell-type foods, such as various kinds of seafood and nuts, have heretofore been developed, some of which even have hammer means thereon. However, the present invention presents an improvement in a combination tool particularly adapted to work upon shell-like foods, and having features not found in the prior art, particularly in the same relationship, details of which are set forth below.

SUMMARY OF THE INVENTION

It is among the principal objectives of the present invention to provide a pair of complementary elongated handles pivotally connected at one end to a head which serves as a hammer, said handles adjacent the pivoted ends thereof having similar curved recesses for engaging nuts, crab and lobster legs, and the like, and said handles then having mating flat surfaces extending toward the free end of the handle and separably abutting each other for positioning in a friction-like manner within a socket formed in one end of a unitary handle member, which is adapted to be manually engaged and operable to use the assembled elements described above as a hammer for cracking the shells of shell-type foods, such as nuts, lobsters and crabs, and even some forms of bi-valve shellfish, including oysters, clams and the like.

It is another object of the invention, especially in relation to the foregoing object, to provide on said unitary handle, a metal blade of a type adapted to be used in opening crabs and oysters, and said blade when in inoperative position, such as when the unitary handle is connected frictionally to the outer ends of the pair of handles, referred to above, the blade is disposed within a thin elongated opening within said pivoted handles and extending inward from the outer ends thereof and formed in said flat surfaces to shield said blade and protect it when said unitary handle is in handle-forming position with relation to said elongated pivoted handles.

A further object of the invention is to provide said head with a generally elongated rectangular recess extending inwardly from one elongated face of the head, the length and width of said recess being complementary to said opposite ends of said handles and receiving the same for pivotal connection to said head, said opposite ends of said handles having parallel opposite flat surfaces slidably engaging opposite side surfaces of said recess and also having semi-circular end surfaces between said flat surfaces to permit limited pivotal separation of said handles when used to crack shell-like food.

Still another object of the invention is to preferably form all of the components of the utility device, except the blade and pivot means, by molding the same from rigid and preferably tough plastic material, and also providing the unitary handle with a series of relatively deep transverse circumferential grooves formed between opposite ends thereof, whereby said grooves and the recess in said head minimize the mass of plastic material required to form said components and also minimize the setting time required to mold the same, thereby minimizing the cost of production of the device.

A still further object of the invention is to form the outer surfaces of said elongated pivoted handles with similar tapers toward the outer ends thereof to enhance the frictional engagement of said outer ends with the socket of said unitary handle to secure said handles together in frictional, but separable manner.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT

Figure 1:
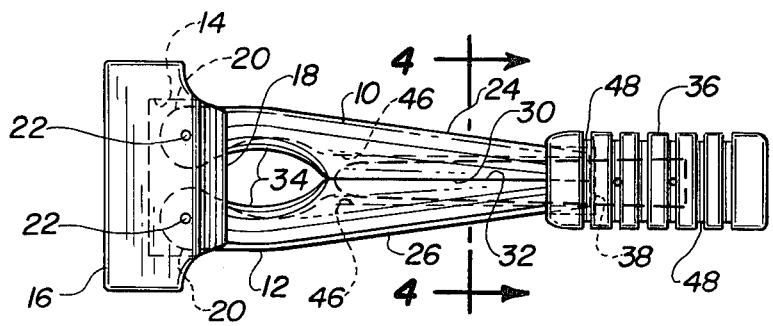
FIG. 1 is a plan view of a combination utility device having a hammer-like head and embodying the principles of the present invention.
Figure 2:
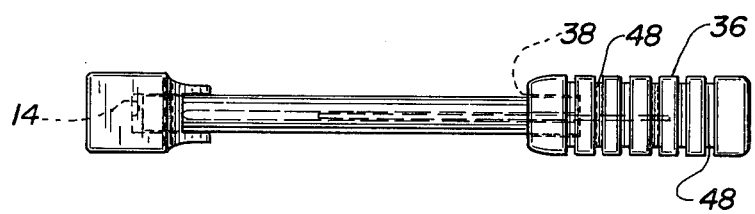
FIG. 2 is a side elevation of the utility device shown in FIG. 1.

Referring to FIGS. 1 and 2, wherein applicant's preferred construction is illustrated respectively in plane and side elevations, it will be seen that the same comprises a pair of similar complementary elongated handles 10 and 12, which are substantially mirror images of each other and are pivotally connected at one end within a recess 14 formed in one wall of an elongated head 16 capable of serving as a hammer at least for use in cracking shell-like food, such as shellfish, nuts and similar other foods. Preferably, the recess 14 is rectangular in side elevation, as seen in FIG. 1, and also as viewed from the wall 18 of head 16 from which the recess 14 extends into the head, the shape is also rectangular. The ends 20 of the handles 10 and 12 which are pivotally mounted within the recess 14 are semicircular in shape, and the opposite faces thereof are parallel and respectively slidably engage opposite side surfaces of the rectangular recess 14 and actual pivotal connection is effected by pins, such as metal pins 22, which extend through at least one wall of the recess 14 and also the semi-circular ends 20 of the handles 10 and 12.

Particularly from FIG. 1, it will be seen that the outer surfaces 24 and 26 of handles 10 and 12 respectively taper toward the outer ends 28 thereof, and the opposite surfaces 30 and 32 of the elongated handles 10 and 12 are flat and straight, and when in closed position, such as shown in FIG. 1, flatly abut each other. Said flat surfaces extend from the outer ends 28 of the handles 10 and 12 toward the pivoted ends but terminate adjacent similar curved recesses 34, which terminate at one end adjacent the semi-circular pivoted ends 20 from handles 10 and 12, said curved recesses primarily being provided for purposes of cracking shell-like food, such as crabs, lobster, nuts, bone to expose the marrow, and other similar foods capable of being cracked by said device.

Figure 5:
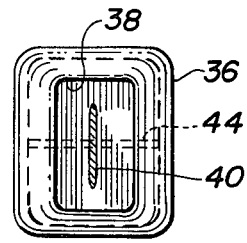
FIG. 5 is a similar view taken on the line 5—5 of FIG. 3.

The combination utility device also includes a unitary handle 36 in one end of which a socket 38 is formed, which is shown best in cross-section in FIG. 5. The socket 38 is of limited depth, as indicated in dotted lines in FIG. 3, the purpose of the socket 38 being to frictionally receive the outer end portions 28 of the handles 10 and 12, as clearly shown in FIGS. 1 and 2, when the flat surfaces 30 and 32 of said handles abut each other, as shown in FIG. 1. Due to the fact that the handles 10 and 12, head 16 and unitary handle 36 preferably are formed from suitable rigid, and preferably tough plastic material, whereby the head 16 is capable of serving as a hammer for cracking food products, there is sufficient friction between the surfaces of the outer end portions 28 of the handles 10 and 12 with the walls of the socket 38 to maintain the same operatively connected in order that the co-engaged handles 10 and 12 and unitary handle 36 may jointly serve as a handle for purposes of using the head 16 as a hammer for purposes of cracking shell-like food but, when desired, the unitary handle 36 readily may be withdrawn in view of the fact that it also is provided with a metal blade 40, capable of serving as an opening knife for oysters, clams, and the like.

Figure 3:
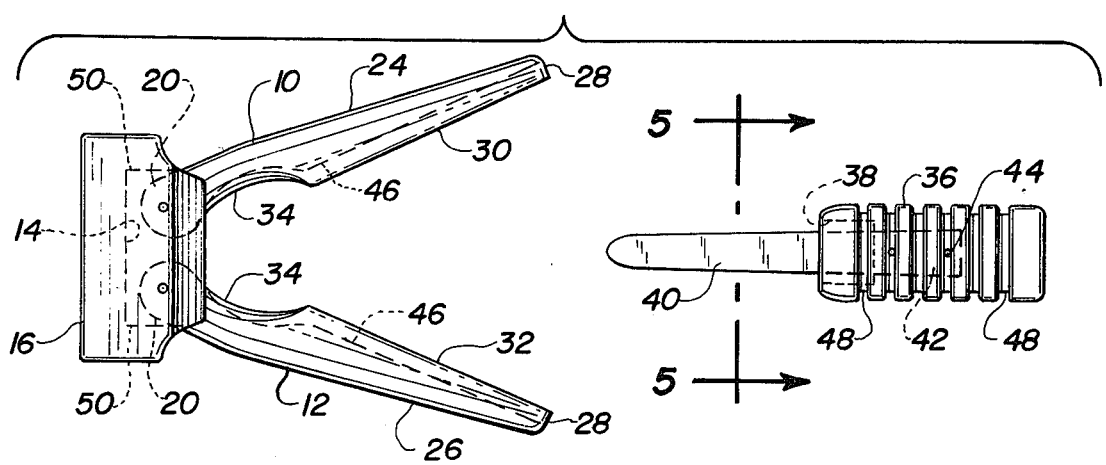
FIG. 3 is an exploded view, showing one part of the utility device having pivoted handles separated from a unitary handle from which a metal blade extends and illustrating the manner in which the pivoted handles may be used for cracking purposes.
Figure 4:
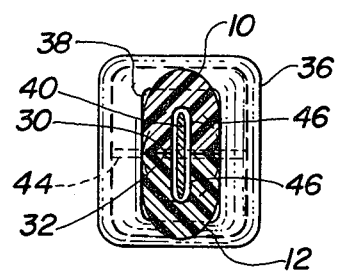
FIG. 4 is an enlarged sectional view taken on the line 4—4 of FIG. 1.

Especially from FIGS. 3–5, it will be seen that the blade 40 has a predetermined width, but is thin, and the tang 42 thereof is embedded within the material from which the unitary handle 36 is formed, such as the aforementioned plastic material but, if desired, suitable means such as pins 44 may be employed to insure a firm connection of the tang of the blade 40 within the unitary handle 36.

Particularly from FIGS. 3 and 4, it will be seen that the flat surfaces 30 and 32 of handles 10 and 12 are provided with longitudinally extending narrow elongated slots 46 which, as shown FIG. 4, are aligned with each other for purposes of forming a common receptacle of elongated nature to receive the blade 40, as when the handles 10 and 12 are brought into the relationship shown in FIG. 1, prior to the unitary handle 36 and blade 40 being connected to the flatly related handles 10 and 12.

In view of the fact that the handles 10 and 12, head 16, and unitary handle 36 preferably are formed from plastic material by molding the same in suitable molds, it is desirable that molded objects such as those referred to be designed to minimize the mass of plastic material which not only is consumed in making an article but also requires a certain amount of setting time before the mold can be opened to eject the molded article. To this end, it will be seen that the handle 36, as clearly illustrated in FIGS. 1–3, is provided with a plurality of longitudinally spaced circumferential grooves 48, which not only afford a good gripping surface for manually engaging the unitary handle 36, but also minimizes the mass of plastic material used to form the same and which must be cured before opening the molds. Similarly, the recess 14 within the head 16 is of a substantial size so as to limit the amount of plastic material required to form the head 16. In addition, if desired, further grooves or indentations, not shown, may be formed either in the sidewalls or the outermost wall of the head 16, for purposes of further limiting the mass of plastic material embodied in head 16.

Further, it will be seen especially from FIG. 3 that the handles 10 and 12 are capable of being separated equally in opposite directions a limited extent, as controlled by the engagement of the outer surfaces of the pivoted end of each of the handles engaging the opposite end walls 50 of the recess 14 in the head 16. In addition, the flat engagement of the surfaces 30 and 32 of handles 10 and 12 with each other, when frictionally secured at the outer ends thereof within the socket 38, provide a highly effective composite handle structure for the head 16.

From the foregoing, it will be seen that the present invention provides a highly useful food-type combination utility device having a hammer-like head, all components of which may be relatively inexpensive, but very accurately formed by molding the same from suitable rigid, but tough, plastic material, thereby making it possible to manufacture the device at reasonable cost. Assembly is of a highly simple nature and primarily comprises inserting the pivot pins 22 to form the handle connection and also connecting the tang of the blade 40 to the unitary handle 36.

Although the preferred materials recited above have been indicated to be suitable plastic, such indication is not to be regarded as restrictive since the various components of the device may be made from other suitable materials, such as wood, metal or otherwise. Further, some of the elements may be made from one selected material, while other elements may be made from different materials. As an example, the head may be made from metal and the elongated handles from plastic or wood.

A further variation from the preferred construction described herein and specifically illustrated in the drawing concerns the elongated handles 10 and 12, which are shown as a pair. It is considered within the purview of the invention that the pair of handles can be made unitary, rather than separate, but provided with a longitudinal recess corresponding to slots 46 to receive the knife blade 40. The curved recesses 34 would be eliminated but the pair of pins 22, preferably, can be used to secure the unitary elongated handle to the head 16 to effect a firm connection.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A food-type utility device comprising in combination:
   a. a pair of similar complementary elongated handles having mating flat surfaces extending from one end and separably abutting each other,
   b. opposing surface portions of the outer end portions of said handles having similar curved recesses operable to crack shell-type foods,
   c. a head extending transversely to the opposite ends of said handles and having a recess to receive the same,
   d. pivot means connecting said opposite ends of said handles to said head, whereby said head is operable as a hammer for use with shellfish and the like, and
   e. a unitary handle member having a socket extending longitudinally inward from one end thereof, said socket being complementary to the abutting portions of said one end of said elongated pivoted handles and frictionally but separably engaging the walls of said socket.

2. The utility device according to claim 1 further characterized by said head being elongated and having a generally elongated rectangular recess extending inwardly from one elongated face of said head, the length and width of said recess being complementary to said opposite ends of said handles, and said opposite ends of said handles having parallel opposite flat surfaces slidably engaging opposite side surfaces of said recess and also having semi-circular end surfaces between said flat surfaces to permit limited pivotal separation of said handles when used as a shell cracker.

3. The utility device according to claim 1 in which said flat surfaces on said elongated handles extend from said one end thereof to the nearest end of said curved recesses and the outer surfaces of said elongated handles have similar tapers toward the outer ends thereof to enhance frictional engagement with the socket of said unitary handle.

4. The utility device according to claim 3 in which said handle also has an elongated flat metal blade having a tang extending longitudinally of said socket and embedded within said handle beyond said socket and secured to said handle, said blade extending substantially beyond said socket and said flat surfaces of said handles having slots extending longitudinally thereinto in opposition to each other and when said surfaces abut each other said slots commonly form an elongated thin recess complementary to and slidably receiving said blade in sheath-like manner.

5. The utility device according to claim 4 in which all the components of said device except the blade and pivot means are formed by molding the same from rigid plastic material and said unitary handle being provided with a series of relatively deep transverse circumferential grooves formed between opposite ends of said handle, whereby said grooves and the recess in said head which receives said opposite ends of said handles minimize the mass of plastic material required to form said components and also minimize the setting time required to mold the same, thereby minimizing the cost of production of the device.

6. The utility device according to claim 4 in which said elongated handles are formed as a single unit provided with a longitudinal elongated thin recess corresponding to said slots to receive said blade in sheath-like manner and said single unit having one end secured within said recess in said head.

* * * * *